United States Patent
Friedrich et al.

(10) Patent No.: US 10,155,452 B2
(45) Date of Patent: Dec. 18, 2018

(54) FUEL CELL SYSTEM HAVING A FUEL CELL STACK ARRANGED IN A HOUSING, AND A MEASURE FOR VENTILATING THE HOUSING

(71) Applicant: Bayerische Motoren Werke Aktiengesellschaft, Munich (DE)

(72) Inventors: Stephan Friedrich, Munich (DE); Martin Scherrer, Poing (DE); Michael Bauer, Unterfoehring (DE); Johannes Schmid, Munich (DE); Norbert Frisch, Planegg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 67 days.

(21) Appl. No.: 15/244,133

(22) Filed: Aug. 23, 2016

(65) Prior Publication Data
US 2016/0355102 A1 Dec. 8, 2016

Related U.S. Application Data

(63) Continuation of application No. PCT/EP2015/051900, filed on Jan. 30, 2015.

(30) Foreign Application Priority Data

Feb. 24, 2014 (DE) .................. 10 2014 203 259

(51) Int. Cl.
*H01M 8/0444* (2016.01)
*H01M 8/0662* (2016.01)
(Continued)

(52) U.S. Cl.
CPC ....... *B60L 11/1883* (2013.01); *B60L 11/1896* (2013.01); *H01M 8/04014* (2013.01);
(Continued)

(58) Field of Classification Search
CPC ............ B60L 11/1883; B60L 11/1896; H01M 2250/20; H01M 8/04014; H01M 8/04067;
(Continued)

(56) References Cited

U.S. PATENT DOCUMENTS

| | | | |
|---|---|---|---|
| 2003/0008185 A1* | 1/2003 | Sugino | H01M 8/04089 429/444 |
| 2004/0234829 A1 | 11/2004 | Sederquist et al. | |

(Continued)

FOREIGN PATENT DOCUMENTS

| | | |
|---|---|---|
| CN | 101981746 A | 2/2011 |
| DE | 10 2008 016 578 A1 | 10/2009 |

(Continued)

OTHER PUBLICATIONS

International Search Report (PCT/ISA/210) issued in PCT Application No. PCT/EP2015/051900 dated Apr. 17, 2015 with English translation (Four (4) pages).

(Continued)

*Primary Examiner* — Carlos Barcena
(74) *Attorney, Agent, or Firm* — Crowell & Moring LLP

(57) ABSTRACT

A fuel cell system, in particular for a motor vehicle, has a fuel cell stack arranged in a housing and a measure for ventilating this housing by coupling the ventilation stream to another gas stream. The ventilation stream is fed to an air stream which is conducted through a radiator of the fuel cell system. The radiator is an ambient air heat exchanger. If the ventilation stream is fed in upstream of the radiator, a venting opening in the housing can be placed in such a way that the ventilation stream is entrained to the radiator by the inflow air stream. Alternatively, the ventilation stream can be fed to an exhaust gas stream of the fuel cell stack and the latter can be fed to the outflow stream of the radiator. A sensor for determining the hydrogen content in a gas stream (Continued)

downstream of the point where the ventilation stream is fed may be provided. An electronic monitoring device which, on the basis of this sensor signal, draws a conclusion about hydrogen which is possibly located in a free state within the housing.

8 Claims, 1 Drawing Sheet

(51) Int. Cl.
- *H01M 8/04089* (2016.01)
- *H01M 8/2475* (2016.01)
- *H01M 8/04014* (2016.01)
- *H01M 8/04007* (2016.01)
- *B60L 11/18* (2006.01)

(52) U.S. Cl.
CPC ..... *H01M 8/0444* (2013.01); *H01M 8/04067* (2013.01); *H01M 8/04089* (2013.01); *H01M 8/04462* (2013.01); *H01M 8/0662* (2013.01); *H01M 8/2475* (2013.01); *H01M 2250/20* (2013.01); *Y02T 90/32* (2013.01)

(58) Field of Classification Search
CPC ........... H01M 8/04089; H01M 8/0444; H01M 8/04462; H01M 8/0662; H01M 8/2475; Y02T 90/32
See application file for complete search history.

(56) References Cited

U.S. PATENT DOCUMENTS

| | | | |
|---|---|---|---|
| 2006/0113131 A1* | 6/2006 | Kato | B60K 1/04 429/434 |
| 2009/0317692 A1* | 12/2009 | Matsumoto | B60K 11/06 429/415 |
| 2010/0003552 A1* | 1/2010 | Kelly | F24D 12/02 429/411 |
| 2011/0027678 A1 | 2/2011 | Nuessle | |
| 2011/0045369 A1 | 2/2011 | Nuessle | |
| 2013/0089800 A1 | 4/2013 | Merth et al. | |
| 2015/0111123 A1 | 4/2015 | Haase et al. | |

FOREIGN PATENT DOCUMENTS

| | | | | |
|---|---|---|---|---|
| DE | 10 2008 016 579 A | 10/2009 | | |
| DE | 10 2010 023 671 A1 | 12/2011 | | |
| JP | WO-2014136553 A1 * | 9/2014 | ............. | H01M 8/24 |
| WO | WO 2013/038051 * | 3/2013 | ............. | H01M 8/04 |
| WO | WO 2013/038051 A1 | 3/2013 | | |
| WO | WO 2014/005793 A2 | 1/2014 | | |

OTHER PUBLICATIONS

German-language Written Opinion (PCT/ISA/237) issued in PCT Application No. PCT/EP2015/051900 dated Apr. 17, 2015 (Six (6) pages).

German-language Search Report issued in counterpart German Application No. 10 2014 203 259.8 dated Sep. 10, 2014 with partial English translation (Twelve (12) pages).

German-language European Office Action issued in counterpart European Application No. 15 703 752.4 dated Nov. 29, 2017 (five pages).

Chinese-language Office Action issued in counterpart Chinese Application No. 201580003058.4 dated Nov. 6, 2017 with English translation (12 pages).

* cited by examiner

FUEL CELL SYSTEM HAVING A FUEL CELL STACK ARRANGED IN A HOUSING, AND A MEASURE FOR VENTILATING THE HOUSING

CROSS REFERENCE TO RELATED APPLICATIONS

This application is a continuation of PCT International Application No. PCT/EP2015/051900, filed Jan. 30, 2015, which claims priority under 35 U.S.C. § 119 from German Patent Application No. 10 2014 203 259.8, filed Feb. 24, 2014, the entire disclosures of which are herein expressly incorporated by reference.

BACKGROUND AND SUMMARY OF THE INVENTION

The invention relates to a fuel cell system, in particular for a motor vehicle, having a fuel cell stack arranged in a housing, and having a measure for ventilating the housing by coupling a ventilation flow to another gas flow. With regard to the prior art, reference is made to DE 10 2008 016 579 A1.

For example, for use in a motor vehicle, it is known for a fuel cell stack to be arranged (to be "integrated") in a substantially closed housing, wherein, aside from passage openings that are self-evidently required for media-conducting lines, it is also necessary for ventilation openings to be provided in a wall of the housing in order to permit ventilation of the interior of the housing. This is to be understood, in the present case, as being a "substantially closed" housing, wherein the present invention is also intended to encompass possible housing structures in the case of which no substantially closed side walls are provided, but with which a housing is realized which is substantially closed off at least in an upward direction and below the top side of which it is, for example, possible for hydrogen to accumulate. The hydrogen could, via possible leakage points, escape in small quantities from the media-conducting lines connected to the fuel cell stack.

An air flow, referred to in the present case as a ventilation flow, for the ventilation of the housing and discharge of possibly accumulating hydrogen from the housing is commonly introduced from the surroundings into the housing and discharged into the surroundings again. It is desirable for no dedicated (energy-consuming) delivery device to have to be provided for the delivery of the ventilation flow. In DE 10 2008 016 579 A1, it is proposed that the ventilation flow to be discharged from the housing be admixed to the cathode exhaust-gas flow of the fuel cell stack by way of a de Laval nozzle, utilizing the ejector pump effect. The cathode exhaust-gas flow or exhaust-gas flow of the fuel cell stack thus forms the delivery device for the ventilation flow.

The problem addressed by the present invention is to provide a further measure by which a ventilation flow through or out of a housing which contains a fuel cell stack can be discharged in an expedient manner.

The solution to the problem is, for a fuel cell system having a fuel cell stack arranged in a housing and having a measure for ventilating the housing by coupling the ventilation flow to another gas flow, characterized in that the ventilation flow is supplied to an air flow which is conducted through a radiator, in the form of an ambient-air heat exchanger, of the fuel cell system. Here, a radiator of the fuel cell system is to be understood generally to mean an ambient-air heat exchanger which is designed and provided for cooling at least sub-components of the fuel cell system, which may include not only the stack itself but also, for example, the power electronics of the fuel cell system.

A fuel cell system according to the invention has a radiator in the form of an air-cooling fluid heat exchanger, wherein the cooling fluid is conducted in a suitable manner, for example through the fuel cell stack, and the waste heat thereof is dissipated at least partially via the radiator to the ambient air. The radiator exit air flowing through the radiator must in this case be discharged in a suitable manner, such that, for this purpose, an exit-air guide of a certain design is provided. In this case, the so-called ventilation flow is now also conducted away from the fuel cell system by way of the exit-air guide, such that the exit-air guide, in effect, performs a further function. Here, it may also be provided that a pressure gradient or the like, which at least partially contributes to the delivery of the ventilation flow, is generated by way of the ambient-air flow flowing through the radiator.

As used herein, the ventilation flow may be supplied or admixed, upstream of the radiator, to the air flow that is conducted through the radiator, because, upstream of the radiator, a directed flow is encountered which is not disrupted by lamellar structures or the like of the radiator and which, in effect, entrains the ventilation flow in accordance with the ejector pump principle. In this context, a ventilation opening of the housing can be positioned correspondingly, that is to say preferably directly adjacent to the flow path of the radiator inlet-air flow. In the conventional manner, it is then, or in this case, provided that, either for the radiator inlet-air flow or for the radiator exit-air flow, that is to say generally for the ambient-air flow to be conducted through the radiator, a suitable air delivery device in the form of a fan or the like is provided. In the case of a fuel cell system according to the invention installed in a motor vehicle, when the vehicle is moving, the "relative wind" also functions, in effect, as an air delivery device also for the ventilation flow of the housing that contains the fuel cell stack.

Similarly to the known prior art mentioned above, the ventilation flow of the stack housing may, however, also be supplied or admixed to an exhaust-gas flow of the fuel cell stack, for example by way of a Venturi nozzle, wherein, again, the ejector pump effect is utilized for the delivery of the ventilation flow. According to the invention, the exit-air flow of the radiator is then merged with the exhaust-gas flow, comprising the ventilation flow, of the fuel cell stack, such that multiple gas flows are, in accordance with the invention, conducted away from the fuel cell system together or jointly. Here, the exhaust-gas flow of the fuel cell system may be the cathode exhaust-gas flow and/or the anode exhaust-gas flow, which may by all means be merged, preferably downstream of the admixing of the ventilation flow, in a mixer.

In one aspect, a sensor for determining the hydrogen content in a gas flow downstream of the supply of the ventilation flow is provided, that is to say that, by way of a so-called hydrogen sensor of this type, the hydrogen concentration in the gas flow comprising this ventilation flow is measured. This gas flow may be an exhaust-gas flow as mentioned above or may be the radiator inlet-air flow or the radiator exit-air flow or a mixed gas flow comprising one or more of the flows. Thus, with the aid of an electronic monitoring unit, it can be checked whether an inadmissible amount of free hydrogen would pass with the mixed gas flow into the surroundings. It is possible, if appropriate, for suitable measures for this purpose, or for preventing this, to be introduced. If appropriate, with the aid of a sensor of the type and a suitable electronic monitoring unit, it is also possible, on the basis of the hydrogen content (="sensor signal") registered by the sensor, for a conclusion to be drawn regarding hydrogen possibly freely situated within the housing. If the gas flow contains exit air, already including hydrogen, of the fuel cell stack, it is specifically the case that the hydrogen concentration present therein is known, at least from a model calculation, to an electronic control unit for the control of the operation of the fuel cell stack, for which reason a hydrogen concentration higher than the known hydrogen concentration is indicative of additional hydrogen from the ventilation flow. It is basically thus possible, by way of a single sensor, to dispense with a (further) dedicated hydrogen sensor within the housing or for the ventilation flow alone.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, identical elements are denoted by the same references designations.

DETAILED DESCRIPTION OF THE DRAWINGS

Figure 1:
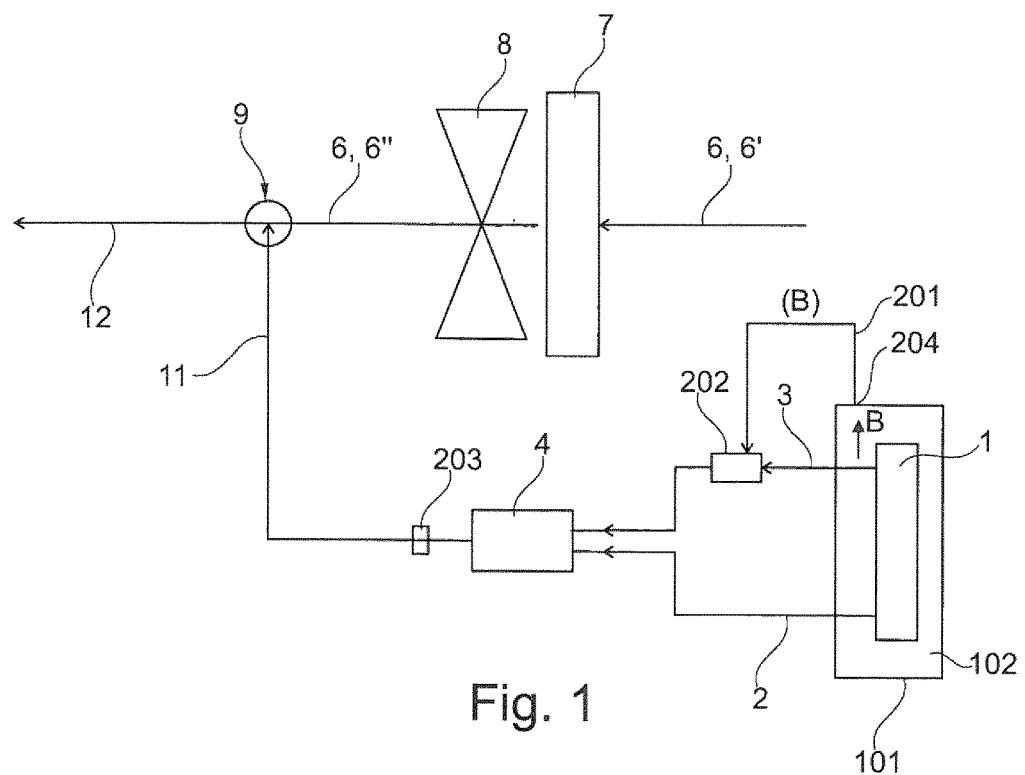
FIG. 1 is a schematic diagram illustrating an exemplary embodiment of the present invention.

In the figures, a fuel cell stack bears the reference designation 1. The fuel cell stack 1 is surrounded by a housing 101, that is to say the fuel cell stack 1 is arranged within the housing 101 and is situated with the housing, for example, in an engine compartment of a motor vehicle. For the sake of simplicity, the illustration does not show the supply of gaseous hydrogen and compressed ambient air, and possibly water for the wetting of the fuel cell membrane, that is known to a person skilled in the art (in the case of a PEM fuel cell), to or into the fuel cell stack 1. In a known manner, electrical energy is generated in the fuel cell stack by oxidation of the hydrogen, whereas the reaction products and excess educts and a purging gas, for which purpose use is likewise made predominantly of hydrogen in a known manner, are discharged, as fuel-cell exhaust gas, via an exhaust-gas line 11. Here, from the anode sides of the multiple individual fuel cells stacked one above the other in the fuel cell stack 1, there extends an anode-side exhaust-gas line 2, in which the anode exhaust-gas flow is conducted, and, from the cathode sides of the multiple individual fuel cells stacked one above the other in the stack 1, there extends a cathode-side exhaust-gas line 3, in which the cathode exhaust-gas flow is conducted. In the present exemplary embodiments, the anode-side exhaust-gas line 2 and the cathode-side exhaust-gas line 3 are merged, by way of a mixer 4, to form the (common) exhaust-gas line 11 of the fuel cell system, though this is not imperatively necessary.

A further constituent of the fuel cell system is a radiator 7 in the form of an air-cooling fluid heat exchanger, through which there is conducted a cooling fluid, which cooling fluid is furthermore preferably conducted in suitable fashion through the fuel cell stack 1 and is cooled by way of an air flow 6 from the surroundings. The air flow also is referred to as radiator inlet-air flow 6' and is conducted through the radiator 7. The radiator inlet-air flow 6 is delivered by way of an air delivery device 8, which is in the form of a fan and which, in this case, is arranged downstream of the radiator 7 and which therefore, more precisely, delivers the radiator exit-air flow 6". Here, the radiator exit-air flow 6" may be conducted within a suitable air-conducting device which has a closed cross section; alternatively, the radiator exit-air flow 6" may, however, also be formed by suitably shaped walls of an engine bay, for example of a motor vehicle, in which the fuel cell system is installed.

The space 102 within the housing 101 in which the fuel cell stack 1 is situated must be ventilated because, owing to minimal leaks, which may be present or cannot be eliminated entirely, in the supply and discharge lines of the fuel cell stack 1, it would otherwise be possible for free hydrogen to accumulate in relatively high concentrations, which must imperatively be avoided. By way of a supply opening (not illustrated in the figures), it is thus possible for ambient air to pass into the housing, which ambient air is, via a ventilation opening 204 which is positioned suitably in a wall of the housing 101, is discharged as a so-called ventilation flow B out of the housing 101. Here, the discharged ventilation flow B may include a small amount of free hydrogen, for which reason the ventilation flow B should be conducted away from the fuel cell system in targeted fashion. Or, if the system is installed in a motor vehicle, it should be conducted out of the motor vehicle in targeted fashion.

In the exemplary embodiment as per FIG. 1, the ventilation flow B is conducted within a ventilation line 201 which leads from the ventilation opening 204 in the housing 101 into the cathode-side exhaust-gas line 3, specifically via a Venturi nozzle 202 provided in the latter. This Venturi nozzle thus, in the manner of an ejector pump, utilizes the flow energy of the cathode exhaust-gas flow to deliver the ventilation flow B in a desired manner also within the housing 101 and into the housing. Furthermore, in the exemplary embodiment as per FIG. 1, the exhaust-gas line 11, in which the ventilation flow B emerging from the housing 101 is thus also conducted, is led to the radiator exit-air flow 6" and designed such that the radiator exit-air flow 6 is merged, in a mixing region 9 illustrated merely in abstract form, with the gas flow conducted in the exhaust-gas line 11. By way of a gas conduit 12 which adjoins the mixing region and which may be in the form of a suitable gas-conducting device which has a closed cross section, or else alternatively may be formed by suitably shaped walls of an engine compartment, for example of a motor vehicle in which the fuel cell system is installed, the fuel-cell exhaust gas, including the ventilation flow B and the air flow 6, 6" conducted through the radiator 7, is finally discharged into the surroundings in targeted and suitably guided fashion.

Figure 2:
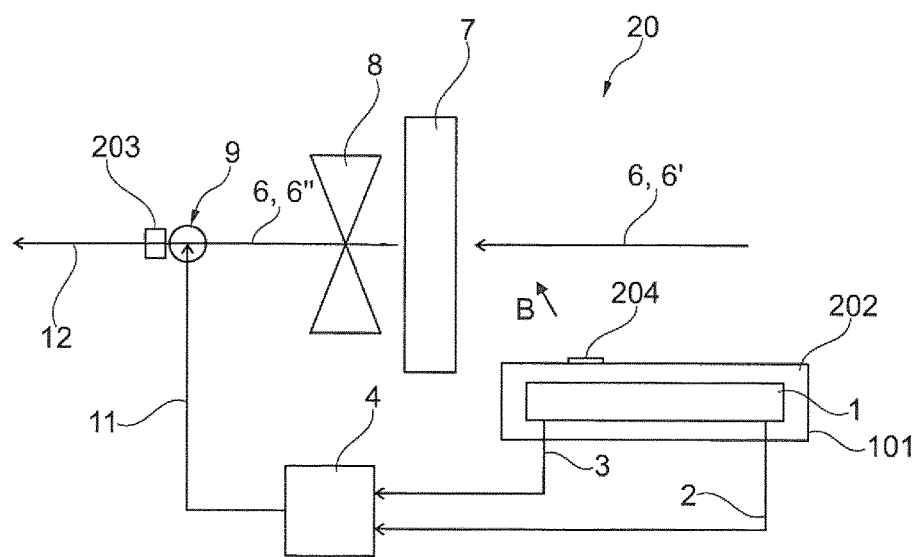
FIG. 2 is a schematic diagram illustrating a further exemplary embodiment of the present invention.

In the exemplary embodiment as per FIG. 2, the ventilation flow B emerging from the ventilation opening 204 of the housing 101 is supplied to the radiator inlet-air flow 6' by virtue of the housing 101, or the ventilation opening 204 thereof, and the radiator 7 being arranged relative to one another such that the radiator inlet-air flow 6', by way of its flow energy, in effect entrains or generally conveys the ventilation flow B out of the housing 101 via the ventilation opening 204 (and thus also into the housing). Thus, in this case, too, the ventilation flow B is discharged together with the radiator exit-air flow 6" from the fuel cell system, wherein, in this case, too, a mixing region 9 is again provided in the conduit of the radiator exit-air flow 6", in which mixing region the fuel-cell exhaust gas that is conducted via the exhaust-gas line 11 is mixed with the radiator exit-air flow 6", though this is not imperatively necessary. Analogously to the exemplary embodiment as per FIG. 1, it is also the case in the exemplary embodiment as per FIG. 2 that the gas mixture is conducted away from the fuel cell system, and/or out of a motor vehicle comprising said system, by way of a suitable gas conduit 12.

In each of the exemplary embodiments shown, a hydrogen sensor denoted by the reference designation 203 is provided. The hydrogen sensor comes into contact with one of the conducted gas flows which also include the ventilation flow B, such that, by way of a suitable electronic control and processing unit which evaluates the signals of the sensor 203, the hydrogen concentration in the respective gas flow (in the exhaust-gas flow in the exemplary embodiment as per FIG. 1 and in the combined gas flow downstream of the mixing region 9 in the exemplary embodiment as per FIG. 2) can be determined.

In the exemplary embodiment as per FIG. 2, it is thus possible, in an extremely simple manner, for the hydrogen concentration in the single gas flow that passes into the surroundings to be monitored with regard to adherence to a predefined limit value. In the case of the hydrogen sensor 203 being arranged as per the exemplary embodiment as per FIG. 1, it is even relatively easily possible to determine the hydrogen concentration in the ventilation flow B, since the hydrogen concentration in the fuel-cell exhaust gas itself is known from model calculations. At any rate, in both cases, owing to the hydrogen sensor 203 (FIG. 1, FIG. 2), no dedicated hydrogen sensor is required within the housing 101 for safety monitoring purposes. It is also pointed out that numerous details may by all means be configured differently from the explanations above, without departing from the content of the patent claims. For example, a membrane may protect the ventilation opening 204 against an ingress of water while ensuring the required gas permeability, such that here (and analogously at an inlet opening for the ventilation flow B), the housing is protected, by way of the measures or similar measures, against an ingress of liquid water.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system, comprising:
   a housing; and
   a fuel cell stack arranged in the housing, wherein
   a ventilation flow that ventilates the housing and is discharged from the housing is supplied to an air flow conducted through an ambient-air heat exchanging radiator of the fuel cell system, where the ambient-air heat exchanging radiator cools a fluid flow other than the ventilation flow, and
   the ventilation flow is supplied upstream of the radiator.

2. The fuel cell system according to claim 1, wherein the fuel cell system is for a motor vehicle.

3. The fuel cell system according to claim 1, wherein the housing comprises a ventilation opening, the ventilation opening being positioned such that the ventilation flow is entrained by an inlet-airflow to the radiator.

4. The fuel cell system according to claim 1, further comprising:
   a sensor configured to determined hydrogen content in a gas flow downstream of the supply of the ventilation flow; and
   an electronic monitoring device which, based on a signal of the sensor, monitors the hydrogen content in the mixed gas flow.

5. The fuel cell system according to claim 4, wherein the electronic monitoring device is configured to draw a conclusion regarding hydrogen possibly freely situated within the housing of the fuel cell system.

6. A fuel cell system, comprising:
   a housing; and
   a fuel cell stack arranged in the housing, wherein
   a ventilation flow that ventilates the housing and is discharged from the housing is supplied to an air flow conducted through an ambient-air heat exchanging radiator of the fuel cell system, where the ambient-air heat exchanging radiator cools a fluid flow other than the ventilation flow,
   the ventilation flow is supplied to an exhaust-gas flow of the fuel cell stack, and
   the exhaust-gas flow is supplied, via an exhaust gas line, to an exit-air flow of the radiator.

7. The fuel cell system according to claim 6, wherein the exhaust-gas flow is supplied to the exit-airflow of the radiator in a mixing region.

8. The fuel cell system according to claim 6, wherein a cathode exhaust-gas flow and an anode exhaust-gas flow of the fuel cell stack are merged in a mixer.

* * * * *